United States Patent [19]

Quinn

[11] Patent Number: 5,406,496
[45] Date of Patent: Apr. 11, 1995

[54] ADAPTIVE DIGITAL CONTROLLER WITH AUTOMATIC PLANT TUNING

[75] Inventor: James P. Quinn, Gurnee, Ill.

[73] Assignee: Recon/Optical, Inc., Barrington, Ill.

[21] Appl. No.: 917,152

[22] Filed: Jul. 20, 1992

[51] Int. Cl.$^6$ .................... G05B 13/02; G05B 23/02; G05B 11/42

[52] U.S. Cl. .................... 364/484; 364/159; 364/161; 364/162

[58] Field of Search ............... 364/484, 161, 162, 163, 364/159, 571.05, 431.05; 318/609, 610

[56] References Cited

U.S. PATENT DOCUMENTS

| | | | |
|---|---|---|---|
| 4,602,326 | 7/1986 | Kraus | 364/158 |
| 4,754,391 | 6/1988 | Suzuki | 364/157 |
| 4,855,674 | 8/1989 | Murate et al. | 364/157 X |
| 4,903,192 | 2/1990 | Saito et al. | 364/157 |
| 5,155,422 | 10/1992 | Sidman et al. | 318/560 |
| 5,268,625 | 12/1993 | Plummer | 364/162 X |

OTHER PUBLICATIONS

Yang et al., "An Approach to Automatic Tuning of Phase-Lead and Phase-Lag Compensators" Decision and Control, 1991 30th Annual Conference pp. 2944-2945.

European Patent Application No. 360,206 A2, Saito et al. (Mar. 28, 1990).

Digital Signal Processing Applications With The TMS320 Family, Texas Instruments, pp. 701-707 (date unknown).

Adaptive Control Algorithm Self-Tunes Industrial Servo, S. Goodnick et al., PCIM, pp. 26-32 (Sep., 1989).

Primary Examiner—Ellis B. Ramirez
Assistant Examiner—Melanie Kemper
Attorney, Agent, or Firm—Allegretti & Witcoff, Ltd.

[57] ABSTRACT

The present invention is a method and an apparatus for automatically tuning a plant. The method includes the steps of applying a plurality of sinusoidal signals to the plant, and measuring the frequency response of the plant to the plurality of sinusoidal signals to detect frequencies at which the plant is resonant. The coefficients of at least one digital filter are calculated such that the at least one filter when combined with the plant suppresses the detected resonances. The method further includes applying at least one sinusoidal signal having a frequency substantially equal to a crossover frequency of the system to the at least one filter and plant, and measuring the frequency response to calculate the magnitude and phase response of the filters and plant at that frequency. The coefficients of the compensator are calculated such that when combined with the plant and the at least one filter the combination provides a response which yields said predetermined system response. An apparatus to substantially perform the method as described is also disclosed.

21 Claims, 11 Drawing Sheets

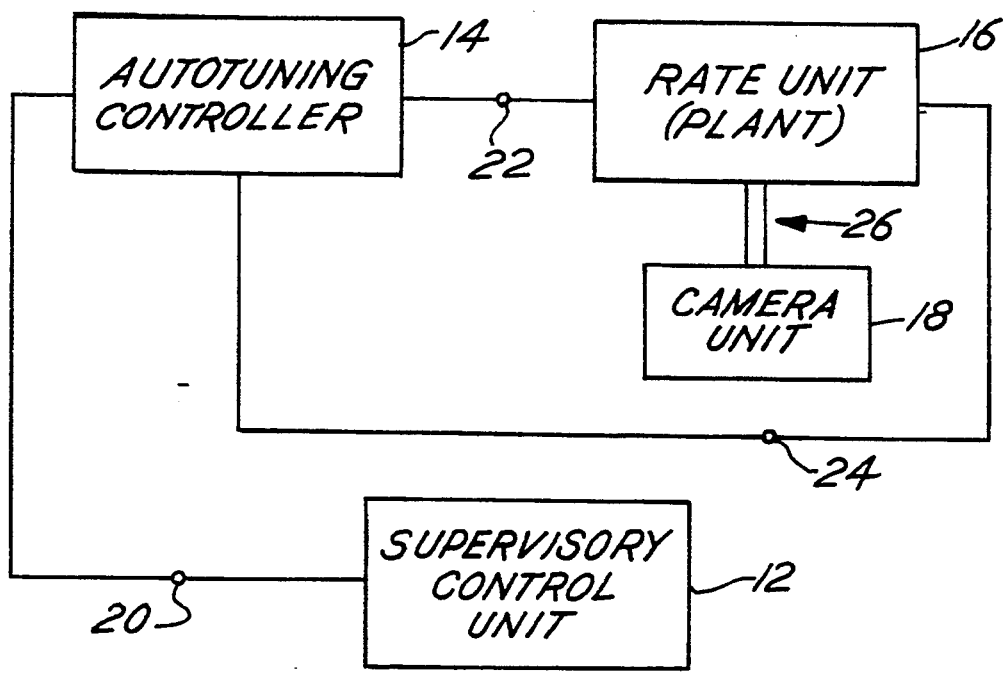
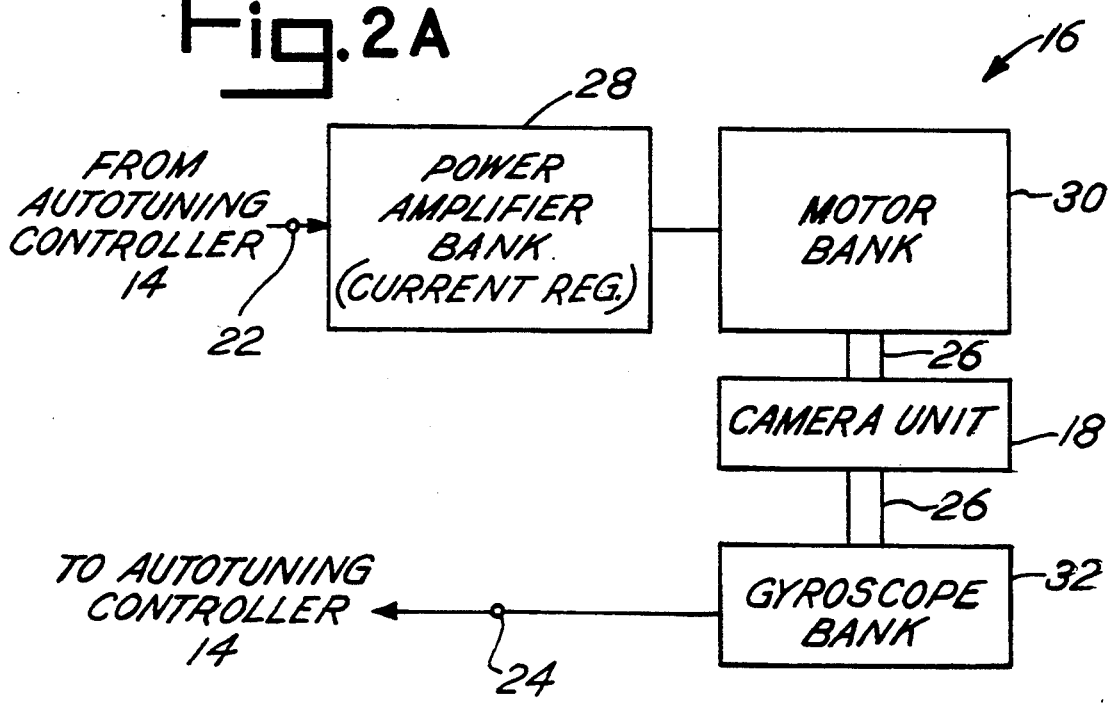

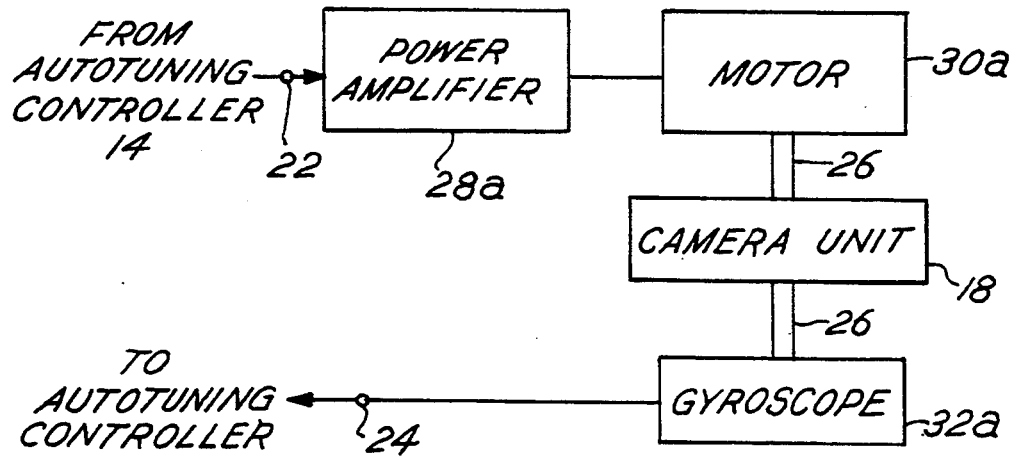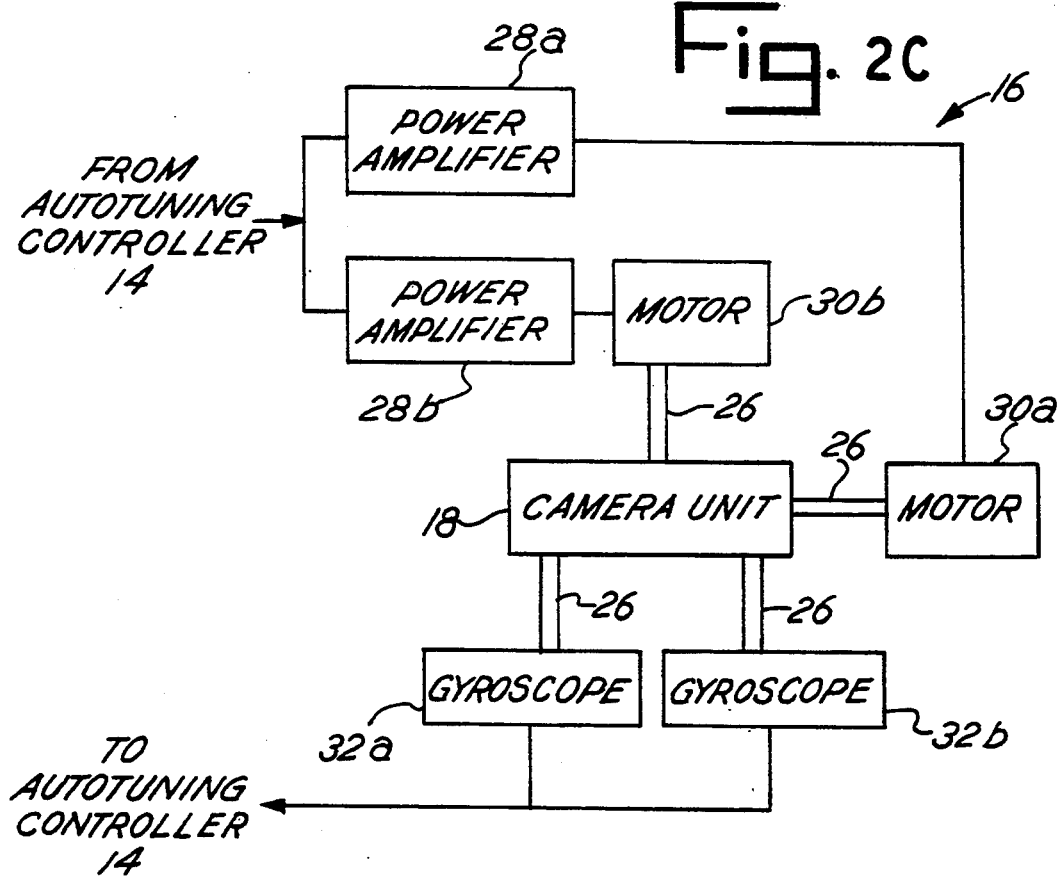

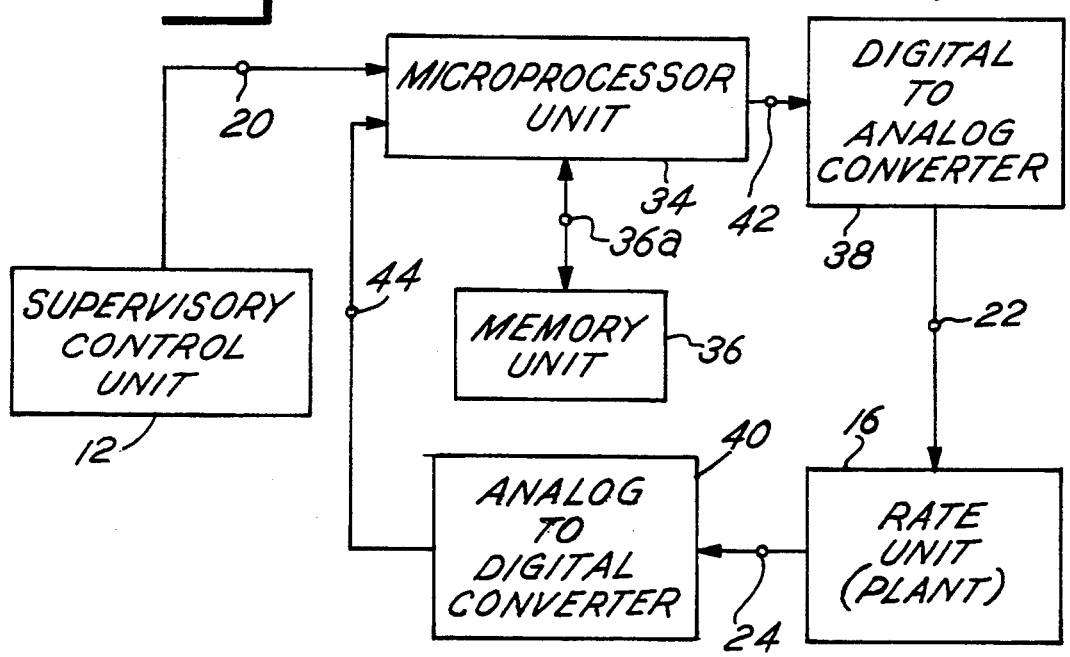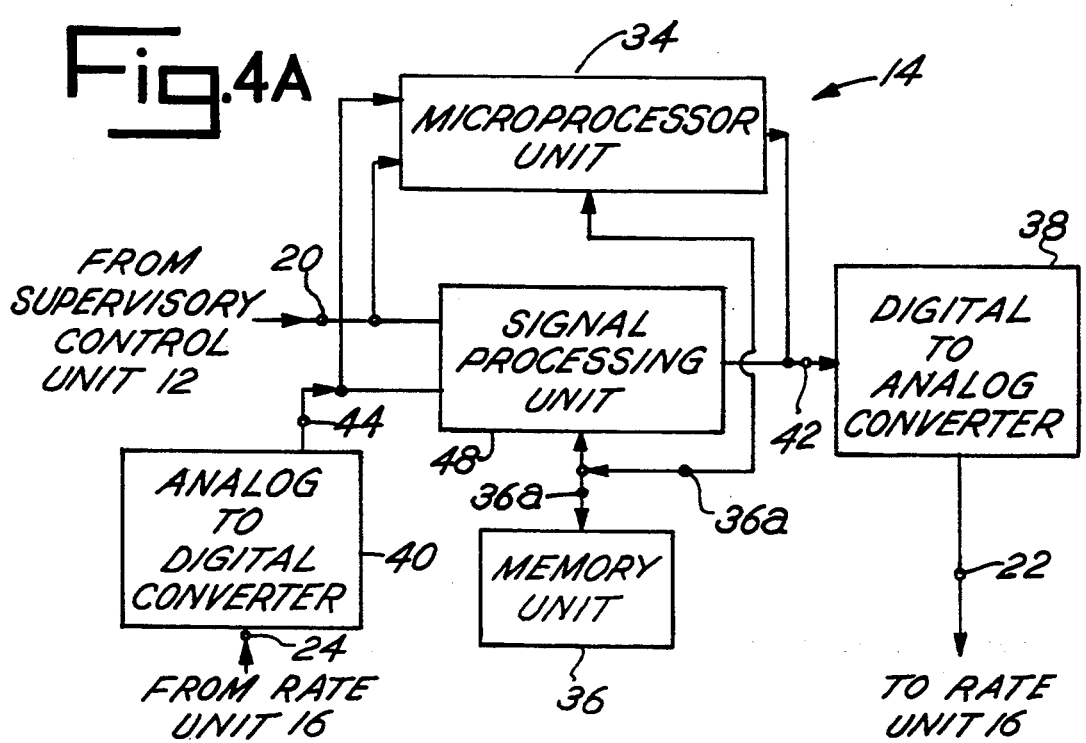

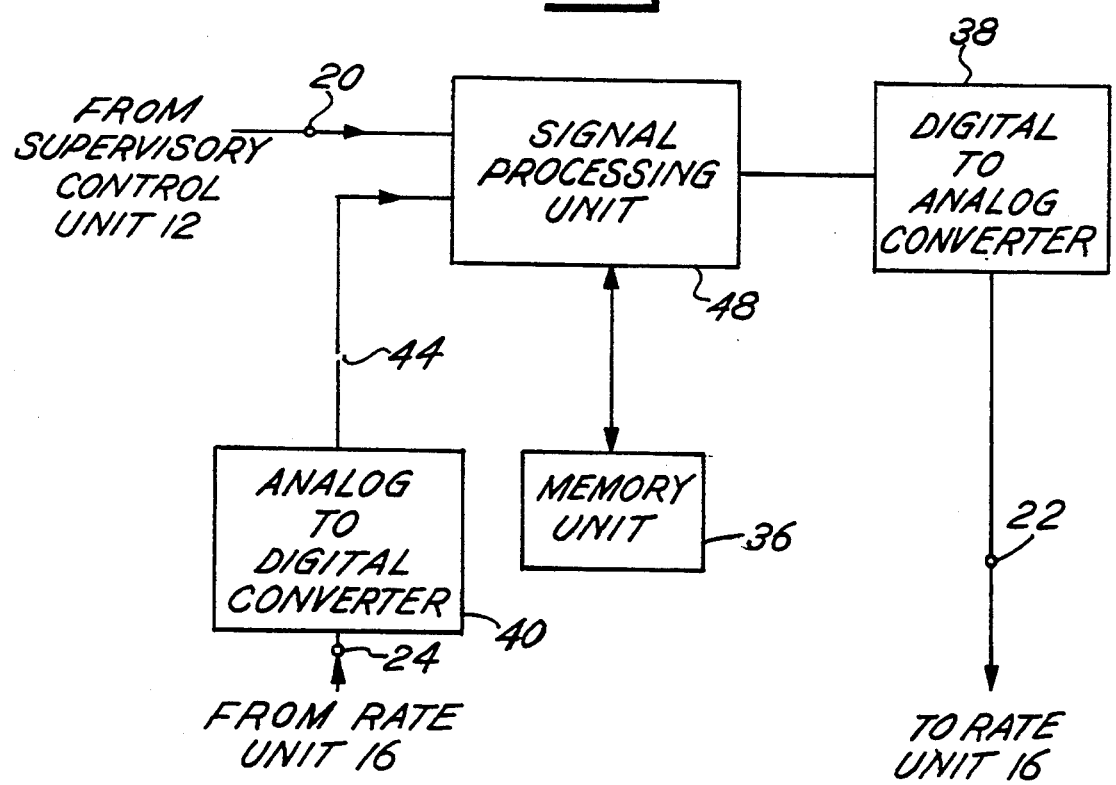

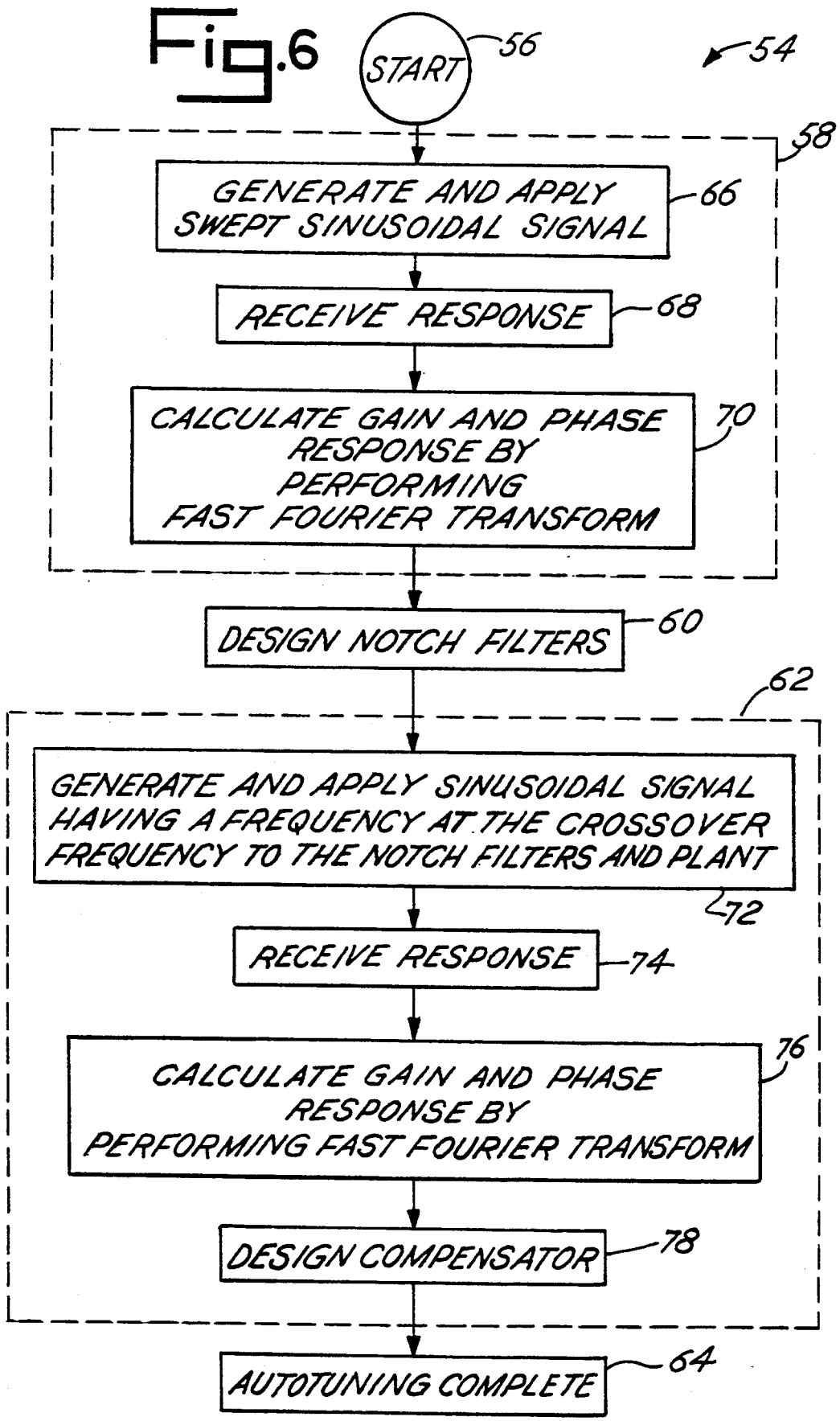

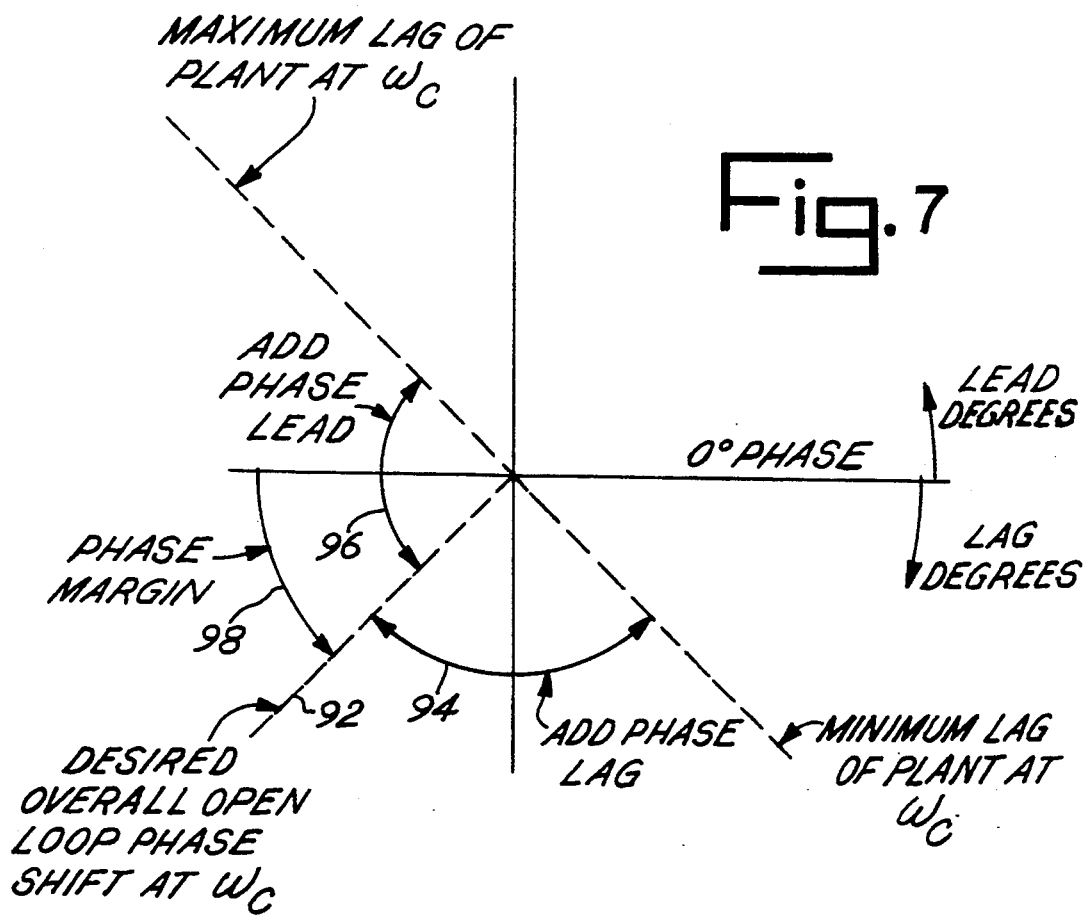
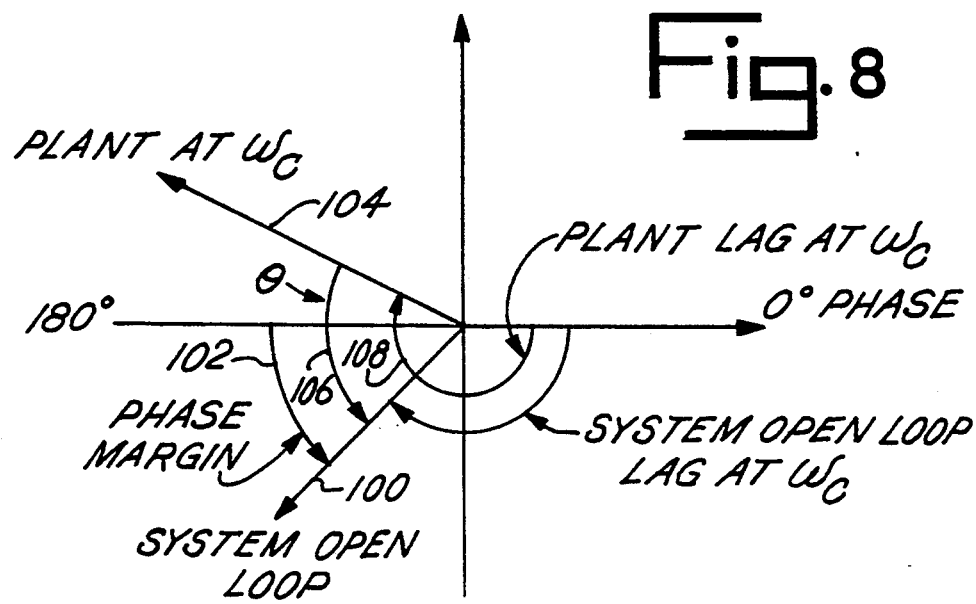

AUTO TUNING SYSTEM

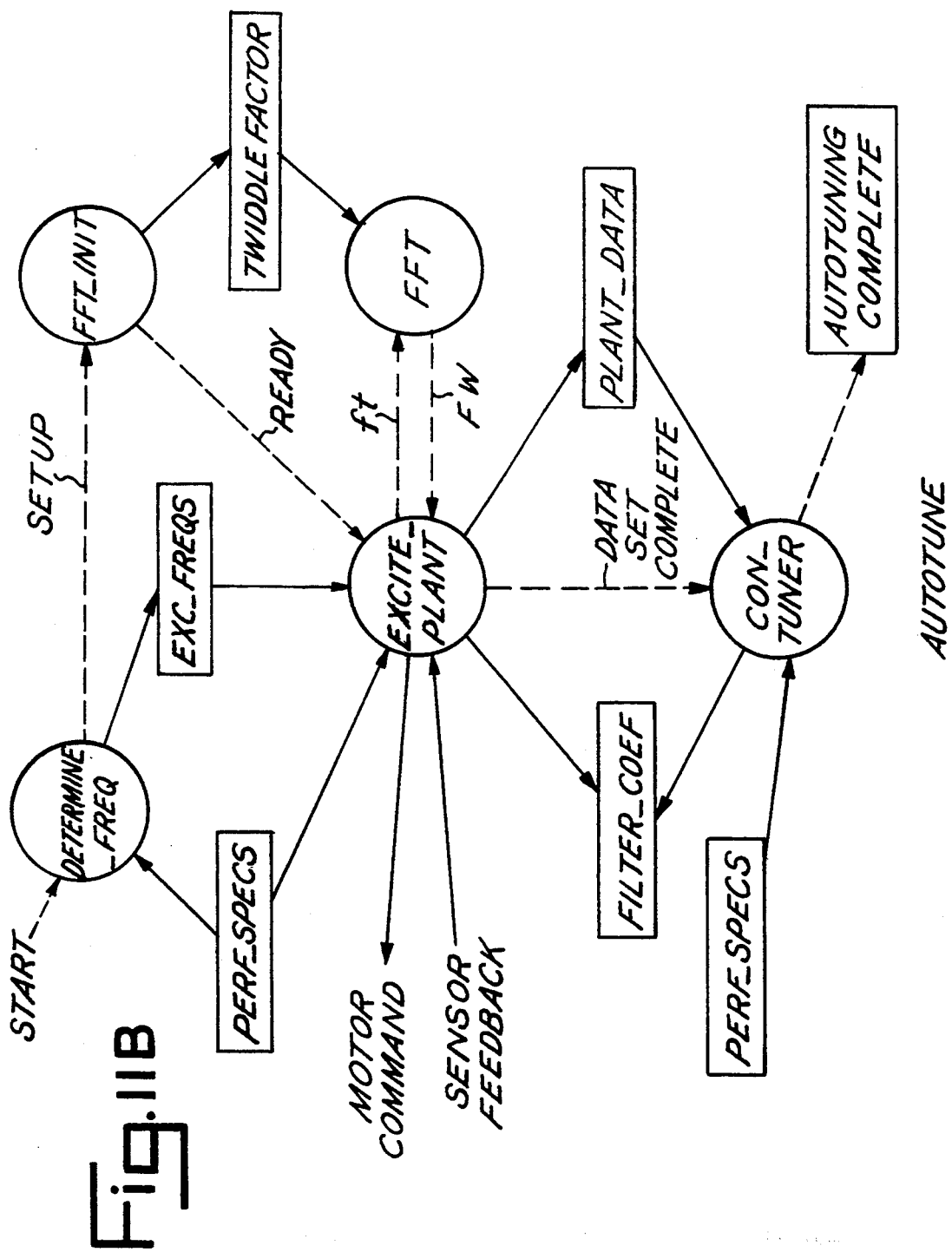

ADAPTIVE DIGITAL CONTROLLER WITH AUTOMATIC PLANT TUNING

BACKGROUND OF THE INVENTION

This invention relates to control systems and more particularly to adaptive control systems for use in tuning a plant in which the control parameters are determined and effected automatically based upon a desired system performance.

Briefly, by way of background, a plant is the controlled element in a system. It is a body, process, or machine, of which a particular quantity or condition is to be controlled. A controller is employed to control the particular quantity or condition of the plant. An adaptive controller performs this type of control in real-time. That is an adaptive controller performs real-time data manipulation to determine and implement control parameters used to produce a satisfactory and consistent response by the plant.

Long range application systems employ controllers for precise tuning of the line-of-sight and line-of-sight rate for use in directing, pointing, tracking and rate control applications for laser, inertial navigation, photography, and radar systems. For example, long range photographic camera systems are employed to provide high resolution reconnaissance photographs from large stand-off distances thereby greatly enhancing mission safety and survivability. Imaging from exceedingly long distances requires a precise image stabilization system to minimize distortions caused by aircraft motion. Further, the long range photographic camera systems' directing, pointing, tracking and rate units require precise tuning to remove or suppress any undesirable characteristics of the components used in the systems and thereby tune the system.

In the environment of long range photographic equipment systems, the plant generally includes a power amplifier, a motor, a gimbal, a mirror and a gyroscope. The power amplifier and motor are employed to precisely control the line of sight, for example, of the laser or camera. One or more inertial rate-integrating gyroscopes mounted on the laser or camera platform serve as angular motion sensors. A feedback device may be employed to measure acceleration, velocity and/or position of the platform.

The control loop or controller generally includes filters and compensators to perform system tuning to remove or reduce any non-idealitics of the components, for example, resonances due to the gyroscope and/or motor. Conventional long range application systems employ analog filters and compensators in the control loop of the rate unit. The filters and compensators are designed from discrete analog components, for example, discrete inductors, capacitors and/or operational amplifiers. They often include potentiometers that facilitate precise filter tuning as well as subsequent "tweaking" when necessary.

Systems employing an analog tuning require an experienced and skilled technician to tune the analog circuits to thereby provide a desired system response. This generally requires utilizing a spectrum analyzing device to measure and characterize the frequency response of the system. Each filter and compensator is then tuned so that the system attains the desired performance specifications.

Analog tuning systems often require many adjustable components to implement a precise tuning network. This often leads to a time consuming and complex tuning procedure that must be performed for each tuning network of each module. Further, analog tuning systems are often complex designs that tend to be very large and bulky in environments under great space constraints.

Employing an adaptive control system alleviates the need for analog filters and compensators used in tuning the system. One such conventional adaptive control system employs a pole-placement method to determine the parameters of the compensator. For example, Goodnick and Lau in "Adaptive Control Algorithm Self-Tunes Industrial Servo," *Intelligent Motion*, September 1989, pages 26–32, describe an adaptive control system employing a pole-placement method to determine a compensator's control parameters for self-tuning to a specified closed loop response. Briefly, in a pole-placement compensator design control algorithm, the system designer specifies the system's closed loop dynamics. Input and output data determine open loop process parameters. The system uses these parameters to compute the compensator coefficients or parameters.

SUMMARY OF THE INVENTION

In a first principal aspect, the present invention is a method for automatically tuning a plant which includes the steps of applying a plurality of plant test signals to the plant, measuring the response of the plant to the plurality of plant test signals to detect resonances of the plant, and calculating coefficients of at least one digital filter such that when combined with the plant the digital filter suppresses the detected resonances. In a preferred embodiment, the digital filters are notch filters calculated using a Tustin transform with prewarping of the resonant frequency and the plant test signals are sinusoidal.

The method further includes applying at least one compensator test signal having a frequency substantially equal to a crossover frequency of the digital filter and plant combination, and measuring the frequency response to calculate the phase and magnitude response of the filter and plant at that frequency. A compensator is calculated having coefficients characterized in that when the compensator is combined with the digital filter and the plant, the combination provides a response which yields a predetermined system response.

In a preferred embodiment, the compensator is a Proportional-Integral-Differential type compensator or a Proportional-Integral type compensator and the compensator test signal is sinusoidal. The coefficients of the compensator may be calculated by the phase necessary to provide a desired predetermined phase margin of the system and the gain necessary to provide a unity gain at the crossover frequency of the system.

In another principal aspect, the present invention is an autotuning system having at least one digital filter and at least one compensator for automatically tuning a plant within a system. The autotuning system includes plant identification means for characterizing the magnitude and phase response of the plant and for detecting resonances of said plant, filter design means for calculating at least one digital filter to suppress the resonances of the plant, and compensator designing means for calculating the compensator necessary to provide a predetermined system response.

The plant identification means includes signal generation means for generating and applying a plurality of plant test signals to the plant, response measuring means for measuring the frequency response of the plant to the plurality of plant test signals, spectrum characterization means for generating the magnitude and phase response of the plant to these plant test signals, and resonance detection means for detecting resonances of the plant.

Filter design means calculates at least one digital filter having coefficients such that when combined with the plant, the digital filter suppresses the resonances of the plant.

Compensator design means includes signal generation means for generating and applying to the digital filter and the plant at least one compensator test signal having a frequency substantially equal to the crossover frequency of the plant, and response measuring means for measuring the frequency response of the digital filter and the plant at the crossover frequency. The compensator design means further includes compensator calculating means for calculating the compensator having coefficients characterized in that when combined with the digital filter and the plant the combination provides a frequency response consistent with the predetermined system response.

BRIEF DESCRIPTION OF THE DRAWINGS

In the course of the detailed description of preferred embodiments to follow, reference will be made to the attached drawings, in which:

FIG. 1 is a schematic block diagram representation of an embodiment of an autotuning system according to the present invention;

FIGS. 2A, 2B and 2C are schematic block diagram representations of various embodiments of rate units according to the autotuning system of FIG. 1;

FIG. 3 is a schematic block diagram representation of a preferred embodiment of an autotuning controller according to the autotuning system of FIG. 1;

FIGS. 4A and 4B are schematic block diagram representations of alternative preferred embodiments of an autotuning controller according to the autotuning system of FIG. 1;

FIG. 6 is a flow diagram illustrating the sequence of operations of an autotuning system of FIG. 1 operated in accordance with a preferred embodiment of the present invention;

FIG. 7 is a phase plot illustrating the phase of a preferred embodiment, including autotuning controller, rate unit, and desired phase margin in omega ($\omega$) at the crossover frequency;

FIG. 8 is a phase plot illustrating the phase response of a preferred embodiment, including autotuning controller, rate unit and compensator phase lead theta ($\theta$) at the crossover frequency;

FIG. 11A, 11B, and 11C, in combination, illustrate a detailed data flow diagram of the autotuning algorithm performed by the autotuning controller of FIGS. 4A or 4B in accordance with the present invention.

DESCRIPTION OF PREFERRED EMBODIMENTS

Figure 5:
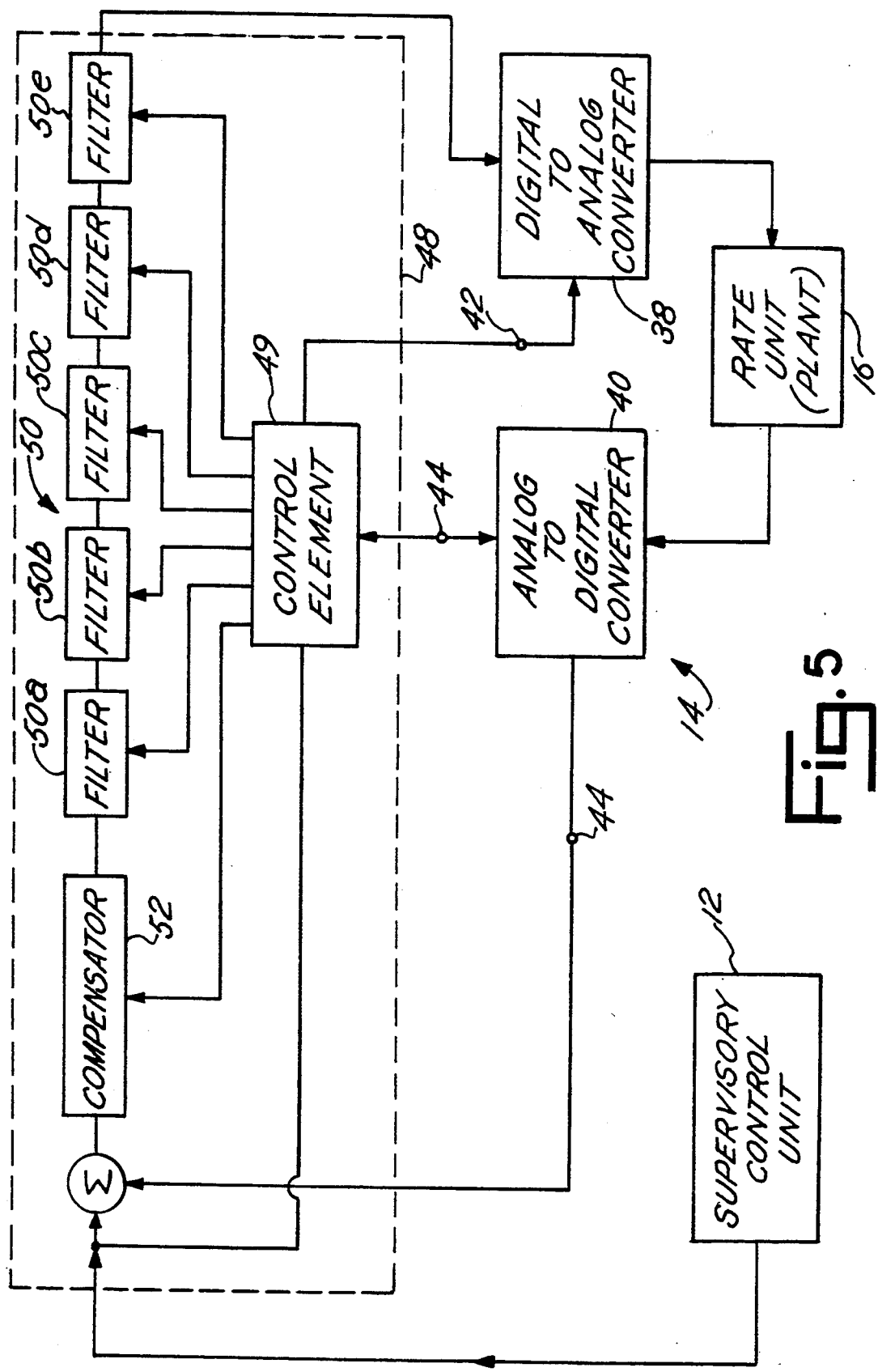
FIG. 5 is a functional block diagram representation of an autotuning controller of FIGS. 3 and 4.

An autotuning system 10 according to the present invention is illustrated in FIG. 1. In the illustrative embodiment, the autotuning system 10 is a long range photographic camera autotuning system. The autotuning system 10 provides precise tuning of a plant. In the description below as well as in the illustrated embodiments, the plant is a rate unit which is utilized to precisely control the positioning of the line of sight of photography equipment. It should be noted that although the invention is described in relation to a long range photographic camera system where the plant is a rate unit, the invention may be employed to tune any plant regardless of its form.

Briefly, long range photographic camera systems are employed to provide high resolution reconnaissance photographs from large stand-off distances. The long range photographic camera systems include directing, pointing, tracking and/or rate units which require precise tuning of the components utilized in the system in order to achieve a desired system performance. A detailed description of a long range photographic camera autotuning system 10 is provided immediately below.

With reference to FIG. 1, the autotuning system 10 includes a supervisory control unit 12, an autotuning controller 14, a rate unit 16, and a camera unit 18. The supervisory control unit 12 is designed to provide overall supervisory control of the elements of the system 10. This includes interface control to facilitate user interfacing with the autotuning controller 14 as well as overall system timing control to facilitate orderly interaction of the elements and various functions of the system 10. The supervisory control unit 12 communicates with the autotuning controller 14 over a multi-wire bus 20.

The autotuning controller 14 is designed to perform automatic tuning of the plant. As mentioned above, in the illustrative embodiments, the plant is a rate unit 16. The autotuning controller 14 may also be utilized to perform image stabilization as well as a variety of other functions. The autotuning controller 14 performs automatic tuning of the rate unit 16 to identify frequencies at which the plant resonates. In response, the autotuning controller 14 designs filters to address these resonances. In addition, the autotuning controller 14 designs at least one compensator having the necessary form of the control law so that when they elements are combined, the response is consistent with the system performance specifications.

In operation, the autotuning controller 14 executes the autotuning algorithm to perform precise tuning of the rate unit 16. The autotuning controller 14 determines an optimum control path based upon desired performance specifications or parameters. Other functions performed by the autotuning controller 14 will become apparent from the detailed discussion below.

The desired performance specifications or parameters may be defined, for example, by the system bandwidth, the system's crossover frequency, the system's phase margin, and the damping factor. Briefly, the system bandwidth is generally known as that range of frequencies over which the system will respond satisfactorily. It is often defined as the range of frequencies within which the system's magnitude response does not differ by more than −3 dB from its value at a particular frequency. The crossover frequency is defined as the frequency where open loop bode plot of the system crosses unity gain (0 dB). The crossover frequency is related somewhat to the desired bandwidth and the disturbance rejection of the system. The phase margin is a measure of a system's relative stability and is often defined as 180° plus the phase angle of the open loop transfer function of the system at unity gain, i.e., at the crossover frequency. The damping factor is a measure of the speed of response by the system. The damping factor is related somewhat to the phase margin of the system.

It should be noted that other parameters which are more specific to an application may also be used to define desired system performance specifications. For example, the disturbance rejection ratio is employed in long range photographic camera systems as a measure of the percentage of movement or disturbance rejection of directing, pointing, tracking and/or rate units. The open loop gain of the system may be translated into disturbance rejection capability.

The rate unit 16 is employed to precisely control the position of the line of sight of 18 camera unit 18. Briefly, in operation, the supervisory control unit 12 and the autotuning controller 14 provide data and control signals to the rate unit 16. In response, the rate unit 16 precisely positions and stabilizes the camera unit 18. The autotuning controller 14 communicates with the rate unit 16 over multi-wire buses 22 and 24. A mechanical coupling mechanism 26 couples the rate unit 16 to the camera unit 18.

FIG. 2A illustrates, in detail, the rate unit 16. The rate unit 16 includes a power amplifier bank 28, a motor bank 30, and a gyroscope bank 32. The number of axes under control dictates the number of elements in each of the power amplifier bank 28, the motor bank 30, and the gyroscope bank 32. For example, with reference to FIG. 2B, in a single axis rate unit, the power amplifier bank 28 includes a power amplifier 28a, the motor bank 30 includes a motor 30a, and the gyroscope bank 32 includes a gyroscope 32a. A single axis rate unit is capable of precise position control of one axis of the camera unit 18, for example pitch.

With reference to FIG. 2C, in a two axis rate unit, the power amplifier bank 28 includes two power amplifiers 28a and 28b, the motor bank 30 includes two motors 30a and 30b, and the gyroscope bank 32 includes two gyroscopes 32a and 32b. A two axes rate unit is capable of precisely controlling the position of two axes of the camera unit 18, for example roll and yaw. In this embodiment, power amplifier 28a, motor 30a, gyroscope 32a are dedicated to precise control of roll and power amplifier 28b, motor 30b, and gyroscope 32b are dedicated to the precise control of yaw.

With reference to FIGS. 2B and 2C, the power amplifier 28a and the motor 30a are employed to perform precise positioning of the camera unit 18. The gyroscope 32, for example an inertial rate-integrating gyroscope, is designed to measure the inertial angular velocity of the camera unit 18 and provide a signal representative of the angular motion of the camera platform (not shown). Normally, the camera platform is mechanically coupled to camera unit 18.

It should be noted that the feedback signal from the rate unit 16 need not be from a gyroscope. The system 10 may alternatively employ accelerometers and/or encoders. Under these circumstances, the accelerometers and/or encoders are mechanically coupled to the camera platform to measure disturbances of the camera unit 18. Here, the accelerometers and/or encoders provide signals representative of the acceleration and/or position, respectively, of the camera platform.

FIGS. 3, and 4A and 4B illustrate hardware architectures and configurations of the autotuning controller 14. FIG. 5 illustrates a functional block diagram of the appropriately programmed autotuning controller 14 illustrated in FIGS. 3 and, 4A and 4B.

With reference to FIG. 3, in a first preferred embodiment, the autotuning controller 14 includes a microprocessor unit 34, a memory unit 36, a digital to analog (D/A) converter 38, and an analog to digital (A/D) converter 40. The microprocessor unit 34 is employed to implement the autotuning algorithm resident in the memory unit 36. The autotuning algorithm is described in detail below.

The microprocessor unit 34 also provides supervisory control over the autotuning controller 14. In particular, the microprocessor unit 34 provides supervisory control over the memory unit 36, D/A converter 38, and the A/D converter 40. The microprocessor unit 34 communicates with the memory unit 36 over multi-wire bus 46. The microprocessor unit 34 communicates with the D/A converter 38 and the A/D converter 40 over multi-wire busses 42 and 44, respectively.

The D/A converter 38 provides an analog signal representative of digital data applied to its input by the microprocessor unit 34. The output of the D/A converter 38 is applied to the power amplifier 28 of the rate unit 16. In a preferred embodiment, the D/A converter 38 is at least a twelve bit digital to analog converter such as the DAC-8412 model manufactured by Analog Devices Corporation.

The A/D converter 40 provides digital data representative of the analog signal applied to its input. The A/D converter 40 receives signals from the gyroscope 32. As mentioned previously, the gyroscope 32 generates signals representative of the angular motion of a camera platform of the camera unit 18. The digital data from the output of the A/D converter 40 is supplied to the microprocessor unit 34 for further processing. In a preferred embodiment, the A/D converter 40 is at least a sixteen bit analog to digital converter such as model ADS930MC manufactured by Datel Corporation.

It should be noted that in those instances where the rate unit 16 employs an encoder to generate positional data of the camera platform, the microprocessor unit 34 may receive the digital data directly from the encoder. In this case, the A/D converter 40 is unnecessary.

With reference to FIG. 4A, in another preferred embodiment, the autotuning controller 14 includes a microprocessor unit 34, a memory unit 36, a digital to analog (D/A) converter 38, an analog to digital (A/D) converter 40, and a signal processing unit 48. In this embodiment, the memory unit 36, the D/A converter 38 and the A/D converter 40 perform a substantially identical function as in the embodiment illustrated in FIG. 3.

The embodiment of FIG. 4A employs the signal processing unit 48 to perform computational intensive tasks. The signal processing unit 48 is under the supervisory control of the microprocessor unit 34. The signal processing unit 48 is employed to implement the autotuning algorithm resident in the memory unit 36. The signal processing unit 48 performs the functions of plant identification, and filter and compensator design.

With reference to FIG. 4B, in another preferred embodiment, the autotuning controller 14 employs the signal processing unit 48 to perform overall supervisory control as well as implementing the autotuning algorithm resident in the memory unit 36. Under these circumstances, the signal processing unit 48 performs the functions formerly performed by the microprocessor unit 34. As a result, the microprocessor unit 34 under these circumstances is unnecessary.

In a preferred embodiment, the signal processing unit 48 is a type TMS320C30 integrated digital signal processor manufactured by Texas Instruments. A digital signal processor of this type is a highly accurate, high resolution signal processor, having a 32 bit floating point word length and a 24 bit mantissa.

With reference to FIG. 5, the autotuning system 10 employs the autotuning controller 14 to perform plant identification including stimulating the rate unit 16 to identify resonances at frequencies within or near the system bandwidth, design filters to address those resonances, and finally design a compensator 52 having the necessary form of the control law to meet a predetermined system performance specification. The autotuning controller 14 controls the rate unit 16 through a filter bank 50 and a compensator 52. That is to say, signals from the autotuning controller 14 are passed through the filter bank 50 and the compensator 52 to the rate unit 16 to provide the desired predetermined system performance.

The autotuning controller 14 generates the filter bank 50 to suppress and/or reduce any resonances resulting from the rate unit 16, for example the motor bank 30 and/or the gyroscope bank 32. The filter bank 50, in a preferred embodiment, includes infinite impulse response second order digital notch filters 50a–e. The design of the notch filters 50a–e is discussed in detail below.

The autotuning controller 14 also generates the compensator 52 to provide the desired response of the system 10, for example the desired phase margin and low frequency response for a predetermined system crossover frequency. The system bandwidth dictates somewhat the disturbance rejection that is obtained in autotuning system 10. In a preferred embodiment, the compensator 52 is a proportional—integral (PI) type controller or a proportional—integral-differential (PID) type controller. The autotuning controller 14 selects the type of compensator 52 implemented based upon the frequency response at the crossover frequency. The autotuning controller 14 implements a controller that provides the desired phase margin and low frequency response to thereby provide the predetermined system performance specification.

With reference to FIG. 6, the autotuning algorithm 54 employed by the autotuning controller 14 to implement the present invention may be arranged generally into three primary functions: a plant identification function 58; a filter design function 60; and a compensator design function 62. Briefly, the plant identification function 58, which includes steps 66, 68, and 70, generates the open loop frequency response of the rate unit 16. The autotuning controller 14 evaluates the open loop frequency response of the rate unit 16 and identifies any resonances in the spectrum.

The filter design function 60 is employed to generate and implement digital filters 50a–e necessary to cancel or substantially reduce the undesired characteristics of the open loop frequency response of the rate unit 16. For example, the filter design function 60 may be employed to generate and implement digital notch filters 50a–e so that when combined with the rate unit 16, the digital notch filters cancel any resonant peaks detected in the plant identification function 58.

The compensator design function 62, which includes steps 72, 74, 76, and 78, generates and implements the compensator 52 necessary to provide the desired characteristics within the system bandwidth when implemented as well as the desired disturbance rejection. For example, the compensator design function 62 may be employed to generate and implement a PI or PID type compensator 52 so that when combined with the rate unit 16 and the digital filters 50a–e the combination has a frequency response consistent with the desired response of the system 10.

Each of the functions including the individual steps, is described in detail immediately below with reference to the embodiment of the autotuning controller 14 of FIG. 4B.

With continued reference to FIG. 6, the autotuning controller 14 performs the plant identification function 58 to characterize the open loop frequency response of the rate unit 16. The autotuning controller 14 generates and applies input signals to the D/A converter 38 which in turn applies an analog representation to the rate unit 16. As mentioned previously, the autotuning controller 14 stimulates the rate unit 16 to identify resonant frequency peaks.

In a preferred embodiment, the autotuning controller 14 generates sinusoidal input signals having frequencies within the range of 0.5 the system bandwidth to ten times the system bandwidth. The sinusoidal input signals are applied to the rate unit 16 and its response is measured by the A/D converter 40. The AID converter 40 supplies a digital representation to the signal processing unit 48.

The autotuning controller 14, and in particular the signal processing unit 48, performs Fast Fourier Transform (FFT) calculations of the output data, i.e., the data applied to the rate unit 16. In addition, the autotuning controller 14 performs FFT calculations on the input data, i.e., the response of the rate unit 16 to the applied data. In a preferred embodiment, the time record with respect to both input data and output data is periodic, and as a result, the frequency and data of interest are concentrated in 1 point of the FFT calculation, making the obtained spectrum more accurate.

The magnitude response of the rate unit 16 at each sinusoidal input signal frequency is calculated by dividing the magnitude of the response by the magnitude of the input signal. The phase response of the rate unit 16 at each sinusoidal input signal frequency is determined by subtracting the phase of the input signal from the phase of the response.

In a preferred embodiment, the sampling time of the A/D converter 40 is maintained to provide a response time record that is substantially periodic with the stimulus frequency, i.e., the sinusoidal input frequency. In a preferred embodiment, the excitation frequencies of the sinusoidal input signals are:

$$(2\pi)(i)/(\text{sample time})/(64) \text{ for } 1 \leq i \leq 32$$

By way of example, if the sample time or the A/D converter 40 is equal to one millisecond, then the frequency resolution in the plant spectrum is approximately 98 radians/second.

It should be noted that employing a swept sinusoidal input signal to measure the spectrum of the rate unit 16 provides a highly accurate characterization of the gain and phase spectrum of the rate unit 16.

The resonant frequencies of the rate unit 16 are estimated from the frequency response of the rate unit 16 to the sinusoidal input signal compared to the ideal response as estimated by the autotuning controller 14. (See the calc-peaks module below and FIG. 11C). In a preferred embodiment, a resonant frequency may be estimated from a resonant "peak" spread between two frequencies. For example, if a 5 dB differential response is measured at 100 Hz and a 8 dB differential response is measured at 125 Hz, using linear interpolation based upon an expected response, a notch may be detected at 120 Hz.

The autotuning controller 14 utilizes the gain and phase data to detect any resonances generated by the rate unit 16. In response, the autotuning controller 14 designs appropriate digital filters to cancel resonances detected in the magnitude response of the rate unit 16. In a preferred embodiment, the autotuning controller 14 designs appropriately placed digital notch filters 50a–e to cancel these resonances. The notch filters 50 a–e are centered about the resonant frequencies that were detected in the plant identification function 58.

The autotuning controller 14, in a preferred embodiment, employs a Tustin transformation as well as prewarping the notch frequency in the design of the appropriate notch filters. It should be noted that employing a Tustin transformation provides accurate positioning of the notch in the filter. A prewarp scale factor on the La Place operator tends to reduce frequency distortion when implementing a notch filter having a notch center frequency that approaches the Nyquist limit.

Below is a preferred method of determining the coefficient relationships of the digital notch filters. The digital notch filters, in this preferred embodiment, are designed using the Tustin transformation with prewarping of the notch frequency.

The Tustin transform is:

$$s = \frac{2}{T} \frac{z-1}{z+1}$$

where:
s = La Place transform operator;
T = sampling time; and
$z^{-1}$ = delay operator.

The La Place transform of the transfer function of a second order filter may be expressed as:

$$H(s) = \frac{as^2 + bs + e}{cs^2 + ds + f} = \frac{O(s)}{I(s)}$$

Substituting the Tustin transform into the filter transfer function provides a second order infinite impulse response transfer function of:

$$H(z) = \frac{a\frac{4}{T^2}\left(\frac{z-1}{z+1}\right)^2 + b\frac{2}{T}\left(\frac{z-1}{z+1}\right) + e}{c\frac{4}{T^2}\left(\frac{z-1}{z+1}\right)^2 + d\frac{2}{T}\left(\frac{z-1}{z+1}\right) + f}$$

The z-transfer function of the second order infinite impulse response filter may be further manipulated and alternately expressed as follows:

$$H(z) = \frac{4a(z-1)^2 + 2bT(z-1)(z+1) + eT^2(z+1)^2}{4c(z-1)^2 + 2dT(z-1)(z+1) + fT^2(z+1)^2}$$

$$\frac{O(z)}{I(z)} = \frac{n_0 + n_1 z^{-1} + n_2 z^{-2}}{d_0 + d_1 z^{-1} + d_2 z^{-2}}$$

$$O(n) = d_0 O(n-1) + d_1 O(n-2) + n_0 i(n) + n_1 i(n-1) + n_2 i(n-2)$$

The relationships between the transfer function coefficients are:

$$\Delta = 4c + 2dT + fT^2$$

$$d_0 = (8c - 2fT^2)/\Delta$$

$$d_1 = (4c - 2dT + fT^2)/\Delta$$

$$n_0 = (4a + 2bT + eT^2)/\Delta$$

$$n_1 = (2cT^2 - 8a)/\Delta$$

$$n_2 = (4a - 2bT + eT^2)/\Delta$$

As mentioned above, in this preferred embodiment, the filter design process 60 utilizes a prewarp scale factor which reduces frequency distortion when implementing a notch filter having a notch center frequency that approaches the Nyquist limit. The preferred prewarp scale factor, k, is characterized as:

$$K = \frac{\omega_0 T}{2} \left( \frac{1}{\tan\left(\frac{\omega_0 T}{2}\right)} \right)$$

As a result, the relationship of a second order infinite impulse response filter coefficients employing prewarping is:

$a = ak^2$ $b = bk$ $c = ck^2$ $d = dk$

Translating the general notch filter relationship to a notch filter having a notch center frequency of $\omega_0$, the filter coefficients have the following filter coefficient relationships:

$a = 1$ $b = 0$ $c = 1$ $d = \omega_0/q$ $e = \omega_0^2$ $= \omega_0^2$ $q = 0.25$ nominally It should be noted that the notch filter center frequency is selected to correlate substantially with the resonant frequency that the notch filter is designed to address.

Here the notch center frequency $\omega_0$ is expressed in radians per second. Further, the "q" is defined as the q factor of notch filter and is generally understood as the measure of the width of the notch in the notch filter.

In a preferred embodiment, the coefficients of each notch filter are determined as indicated above. The center frequency of each notch filter is selected according to the resonant frequency to be suppressed. That is to say, if five resonant frequencies are detected during the plant identification process 58, the autotuning controller 14 designs and implements five digital notch filters where each has characteristics to address a respective resonant frequency. That is to say, each is centered about a resonant frequency.

After the digital notch filter coefficients are generated and the notch filters implemented, the coefficients remain resident in the memory unit 36. This allows the filter coefficients to be recalled by the signal processing unit 48 after a system restart. However, the system 10 may also perform autotuning cycle upon restart or on-command thereby generating a "new" set of notch filter coefficients.

The compensator 52 is designed to compensate for any differences between the measured system response and desired system response. The compensator 52 introduces a necessary phase and gain into the system 10 so that the actual or measured system response approaches the desired system response. A preferred method of the design of the compensator 52 is described in detail below.

With the digital notch filters 50 a–e implemented, the autotuning controller 14 applies a signal to the filter bank 50-rate unit 16 combination. In a preferred embodiment, the stimulating signal is sinusoidal having a frequency substantially equal to the crossover frequency. As mentioned above, the crossover frequency is defined as the frequency where open loop bode plot of the autotuning controller 14-rate unit 16 combination crosses unity gain. The crossover frequency is dictated somewhat by the desired bandwidth and the disturbance rejection of the system 10.

The autotuning controller 14 measures the response of the filter bank 50-rate unit 16 combination to the sinusoidal signal having a frequency substantially equal to the crossover frequency. The signal processing unit 48 performs an FFT calculation on the response of the filter bank 50-rate unit 16 combination and determines its magnitude and phase at the crossover frequency. The autotuning controller 14 utilizes the phase response at the crossover frequency to determines the phase lead or lag that is necessary to yield the desired phase margin of the system 10. The autotuning controller 14 utilizes the magnitude response at the crossover frequency to determine the gain necessary to provide a system 10 gain of unity at the crossover frequency. In response, the autotuning controller 14 selects, generates and implements a PI type or PID type compensator 52 having the aforementioned characteristics to thereby provide the desired the performance specification of the system 10.

The magnitude of the compensator 52, in a preferred embodiment, is determined from the magnitude of the rate unit 16-filter bank 50 combination at the crossover frequency. Since the gain of the system 10 at the crossover frequency is to equal one, i.e., unity gain, the autotuning controller 14 designs a compensator 52 which when implemented provides a unity gain for the system 10 at the crossover frequency. As a result, the autotuning controller 14 calculates the coefficients of a compensator 52 having a gain which is the inverse of the magnitude of the filter block 50-rate unit 16 combination at the crossover frequency.

Now with respect to the necessary phase of the compensator 52, with reference to FIG. 7, the autotuning controller 14 must add or subtract phase lead to make the phase of the rate unit 16 equal to the overall loop system phase. This yields a desired phase margin for the system 10. The autotuning controller 14 implements a proportional-integral (PI) compensator 52 when a phase lag is necessary to provide the required phase margin. In contrast, the autotuning controller 14 implements proportional-integral-derivative (PID) compensator 52 when a phase lead is necessary to provide the required phase margin.

With continued reference to FIG. 7, the desired open loop phase at the crossover frequency for the autotuning controller 14-rate unit 16 combination is indicated by dashed line 92. The autotuning controller 14 implements a PI type compensator 52 when phase response of the filter bank 50-rate unit 16 combination is within the region indicated by the arc 94. In contrast, the autotuning controller 14 implements a PID type compensator 52 when phase response of the filter bank 50-rate unit 16 combination is within the region indicated by the arc 96. The desired phase margin is indicated by the arc 98.

The necessary phase response of the autotuning controller 14 at the crossover frequency is readily identified by examining the phase diagram of FIG. 8. With reference to FIG. 8, the open loop phase response of the system 10 is illustrated by solid line 100. The desired system 10 phase margin is indicated by the arc 102. The open loop phase response of the rate unit 16 is indicated by solid line 104. The total phase introduced by the autotuning controller 16 is indicated by the arc 106 and labeled as theta,$\theta$. As a result, the necessary phase lead, ($\theta$), to be supplied by the autotuning controller 14 may be expressed as:

$$\theta = \text{phase margin}_{lead}\text{-rate unit } 16_{lag} - 180°$$

Below is a preferred method of determining the relationship of the coefficients of the compensator 52. In those instances where a phase lead is necessary to provide the desired phase margin the autotuning controller 14 implements a PID type controller having coefficients which may be expressed as:

$$PID(s) = k_i/s + k_p + k_d s$$

Here, $k_i$ is defined as the integral gain, $k_p$ is defined as the proportional gain, and $k_d$ is defined as the derivative gain. Now, substituting "$j\omega$" into the PID type controller for the La Place operator "s" provides the following description of the PID type controller in terms of frequency:

$$PID(j\omega) = k_i/j\omega + k_p + k_d j\omega$$

which may be alternately expressed as:

$$PID(j\omega) = k_p + j(k_d \omega - k_i/\omega)$$

From the relationship immediately above, the magnitude, $M(\omega)$, and the phase, $P(\omega)$, of the compensator 52 are defined as:

$$M(\omega) = [(k_d \omega - k_i/\omega)^2 + k_p^2]^{\frac{1}{2}} \quad (1)$$

$$P(\omega) = \tan^{-1}((k_d\omega - k_i/\omega)k_p) \quad (2)$$

Substituting the crossover frequency into EQUATION 1 yields a magnitude characterization of the PID compensator 52 of:

$$1/(M(\omega))^2 = (k_d\omega_c - k_i/\omega_c)^2 + k_p^2 \quad (3)$$

Similarly, substituting the crossover frequency into EQUATION 2 yields a phase characterization of the PID compensator 52 of:

$$\tan\theta = ((k_d\omega_c - k_i/\omega_c)/k_p) \quad (4)$$

Figure 9:
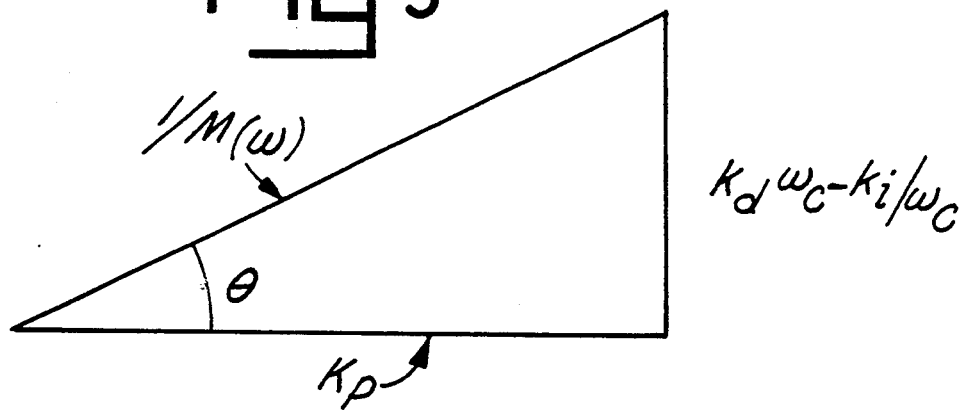
FIG. 9 is an illustration of the relationship of the coefficients of a Proportional-Integral-Differential type compensator.

FIG. 9 illustrates the relationship between coefficients of the compensator 52, as a function of theta ($\theta$), in relation to EQUATION 3 and EQUATION 4. Applying geometric principles, the relationships may be alternately expressed as:

$$k_p = \cos\theta/M(\omega_c) \quad (5)$$

$$k_d = 1/\omega_c(k_i\omega_c + \sin\theta/M(\omega_c)) \quad (6)$$

Briefly, examining EQUATION 5, EQUATION 6 and FIG. 9 reveal that when $\theta$ is greater than zero, the compensator is a type PID and thus introduces a phase lead. In contrast, when $\theta$ is less than zero, the compensator is a type PI and thus introduces a phase lag.

Now, examining EQUATION 5 and EQUATION 6 indicates that there are three unknowns and two equations. A preferred method of solving for the compensator 52 coefficients is detailed below.

Figure 10:
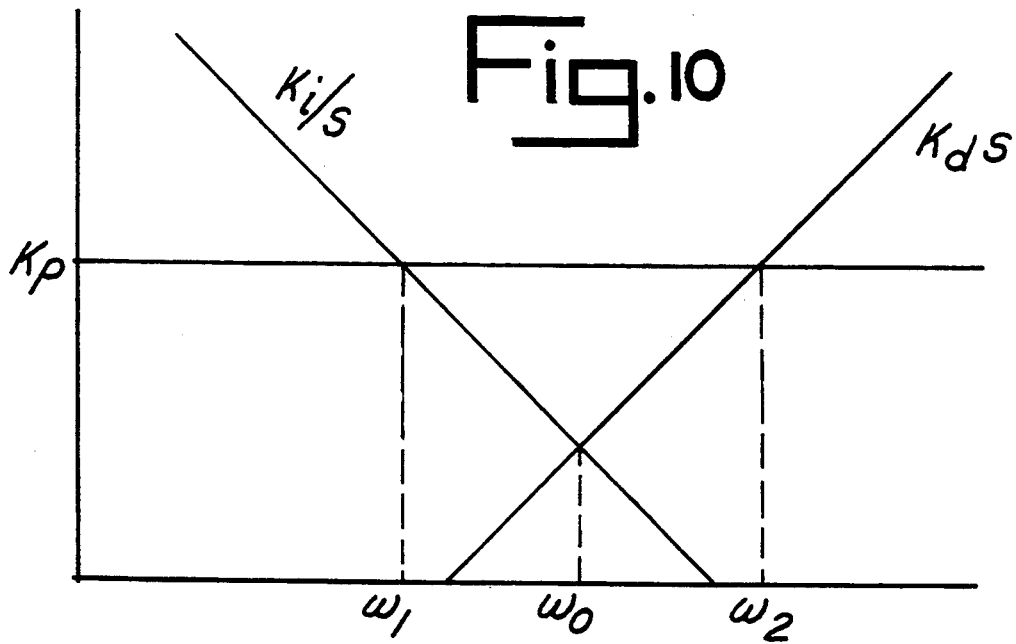
FIG. 10 is a graphical Bode plot illustrating the relationship of the coefficients of a Proportional-Integral-Differential type compensator.

The preferred method of determining the compensator 52 coefficients initially selects or determines the coefficient $k_i$. The method of selection of the coefficient $k_i$ employs the Bode plot of FIG. 10. Examining FIG. 10 reveals that the compensator 52 coefficient and frequency relationships may be expressed as:

$$k_i/\omega_0 = k_d\omega_0$$

$$\omega_0^2 = k_i/k_d$$

$$\omega_1 = k_i/k_p$$

$$\omega_2 = k_p/k_d$$

$$\omega_2/\omega_0 = \omega_0/\omega_1$$

The frequencies $\omega_1$ and $\omega_2$ are defined as the break frequencies or the zeros in the formulation of a type PID compensator 52.

The La Place transfer function of the PID compensator 52 is:

$$PID(s) = k_i/s + k_p + k_ds$$

which may be alternately expressed as:

$$PID(s) = (k_i + k_ps + k_ds^2)/s.$$

The frequencies $\omega_1$ and $\omega_2$ are the defined as the roots of the expression $k_i + k_ps + k_ds^2$ for a given $k_i$ and $k_d$. Examining FIG. 9 reveals that when $k_p$ increases the frequency spread between $\omega_1$ and $\omega_2$ increases. Conversely, when $k_p$ decreases the frequency spread between $\omega_1$ and $\omega_2$ decreases. As $k_p$ decreases, $K_i$ and $k_d$ approach equality thereby forming a pair of complex roots. In a preferred embodiment, a compensator 52 is calculated and implemented to avoid roots which are a complex pair.

As a result, the compensator design process 62, in a preferred embodiment, utilizes a relationship between the frequency $w_1$ and the frequency $\omega_2$ to generate the phase lead specification. Here, the frequency $\omega_1$ is positioned approximately two decades lower in frequency than the frequency $\omega_2$. This provides the advantage of employing a compensator 52 having a pair of non-complex roots, as well as positioning the breaks in the magnitude response of the compensator 52 so that they are not located near the crossover frequency.

It should be noted that this may also provide the advantage of canceling the mechanical time constant of the rate unit 16. The mechanical time constant is generally in the range of 1–10 radians/second.

Thus, in a preferred embodiment, the third formula employed in generating the coefficients of the compensator 52 is:

$$\omega_1 = 0.01(\omega_2)$$

It should be noted that the relationship between the frequency $\omega_1$ and the frequency $\omega_2$ may be generally selected so as to alleviate having a pair of non-complex roots as well as positioning the breaks in the magnitude response of the compensator 52 relatively distant from the crossover frequency.

In a preferred embodiment, $k_d$ is initially approximated to provide a "starting point" or an initial value for the coefficient values. The coefficient $k_d$ is then re-calculated and adjusted after the coefficient $k_i$ is determined. Utilizing EQUATION 6, an initial value for $k_d$ is determined from its dominant term:

$$k_{dNOM} = \sin\theta/M(\omega_c)\omega_c$$

Here, the value of $k_i/\omega_c$ is estimated as being negligible in relation to $\sin\theta/M(\omega_c)$, i.e., $\sin\theta/M(\omega_c)$ is the dormant form of $k_d$.

Using the nominal value of $k_d$, the autotuning controller 14 calculates the coefficients $K_p$ and $K_i$. The relationships of $K_p$ and $K_i$ are restated immediately below.

$$k_p = \cos\theta(\omega_c)$$

$$k_i = k_p\omega_1$$

Then, as mentioned above, a more accurate value of $K_d$ is determined using EQUATION 6 which is reproduced below.

$$k_d = \frac{\left(\dfrac{k_i}{\omega_c} + \dfrac{\sin\theta}{M(\omega_c)}\right)}{\omega_c}$$

Initially, it should be noted that a PI type compensator may be translated or developed from a PID type compensator. This may be accomplished by placing the differential coefficient $k_d$ equal to zero. Further, examining the compensator 52 coefficients as expressed in EQUATION 5, EQUATION 6 and FIG. 9 reveals that a PI type compensator may be developed in a fashion similar to the PID type compensator. The autotuning controller 14 determines that a lag compensator is necessary when $\theta$ is less than zero. The coefficient $k_d$ is zero and the compensator 52 takes the La Place transfer function form of:

$$PI(s) = k_i s + k_p$$

which may be alternately expressed as:

$$PI(s) = (k_i + k_p s)/s$$

Examining this function readily reveals that it yields a zero at $k_i/k_p$. The $k_i/k_p$ zero is the frequency of $\omega_1$.

Employing EQUATION 5 and EQUATION 6, the coefficients of the PI type compensator 52 are:

$$k_p = \cos\theta/M(\omega_c);$$

$$k_i = -(\omega_c \sin\theta)/M(\omega_c).$$

For the purpose of completeness, $k_i$ was derived as follows:

$$k_d = (1/\omega_c)(k_i/\omega_c + \sin\theta/M(\omega_c)$$

$$k_d = 0$$

$$0 = k_i/\omega_c + \sin\theta/M(\omega_c)$$

$$k_i = -(\omega_c \sin\theta)/M(\omega_c)$$

The preceding preferred method calculates a preferred form of an autotuning controller 14 which, when implemented, satisfies a predetermined system performance specification. This preferred method calculates the notch filters 52a-e and the compensator 52 both of which have phase and gain characteristics to satisfy a predetermined system performance specification. Further, when employing this preferred method the low frequency gain may be maximized without having any breaks in the system's magnitude response located near the crossover frequency.

Figure 11A:
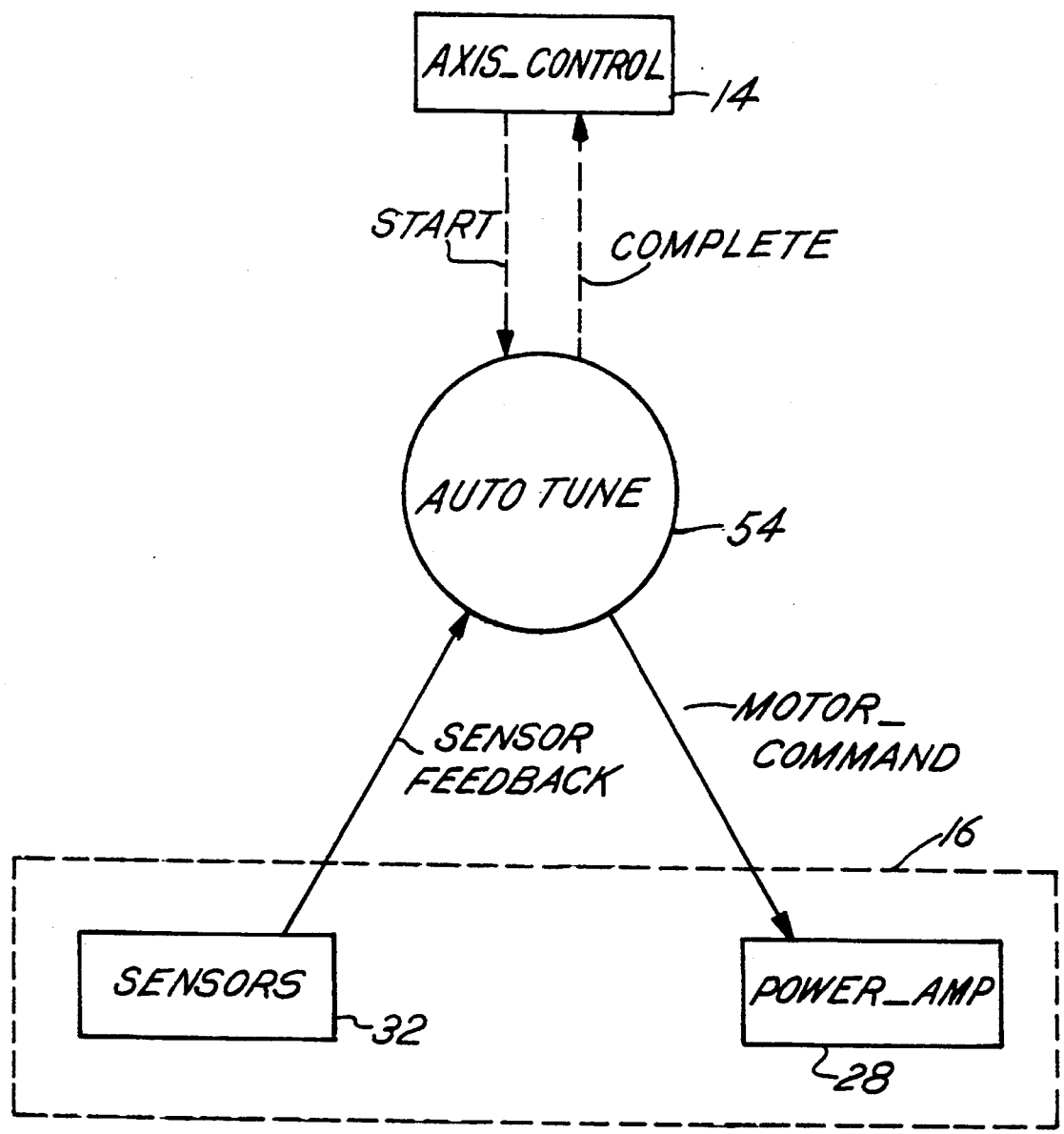

The autotuning operations 54 may be performed by the general purpose microprocessor 34 or by the digital signal processor 48, such as a TMS320C30 digital signal processor. A detailed data and command flow diagram for use with a microprocessor or a digital signal processor is illustrated FIGS. 11A, 11B, and 11C. The data and command flow diagram illustrates the autotuning algorithm 54 in greater detail than the flow diagram illustrated in FIG. 6. FIG. 11A illustrates the functional relationship of the autotuning algorithm 54 illustrated in the detailed data and command flow diagram of FIGS. 11B and 11C, with the autotuning controller 14 and the rate unit 16, in particular the power amplifier bank 28 and the gyroscope bank 32.

Figure 11C:
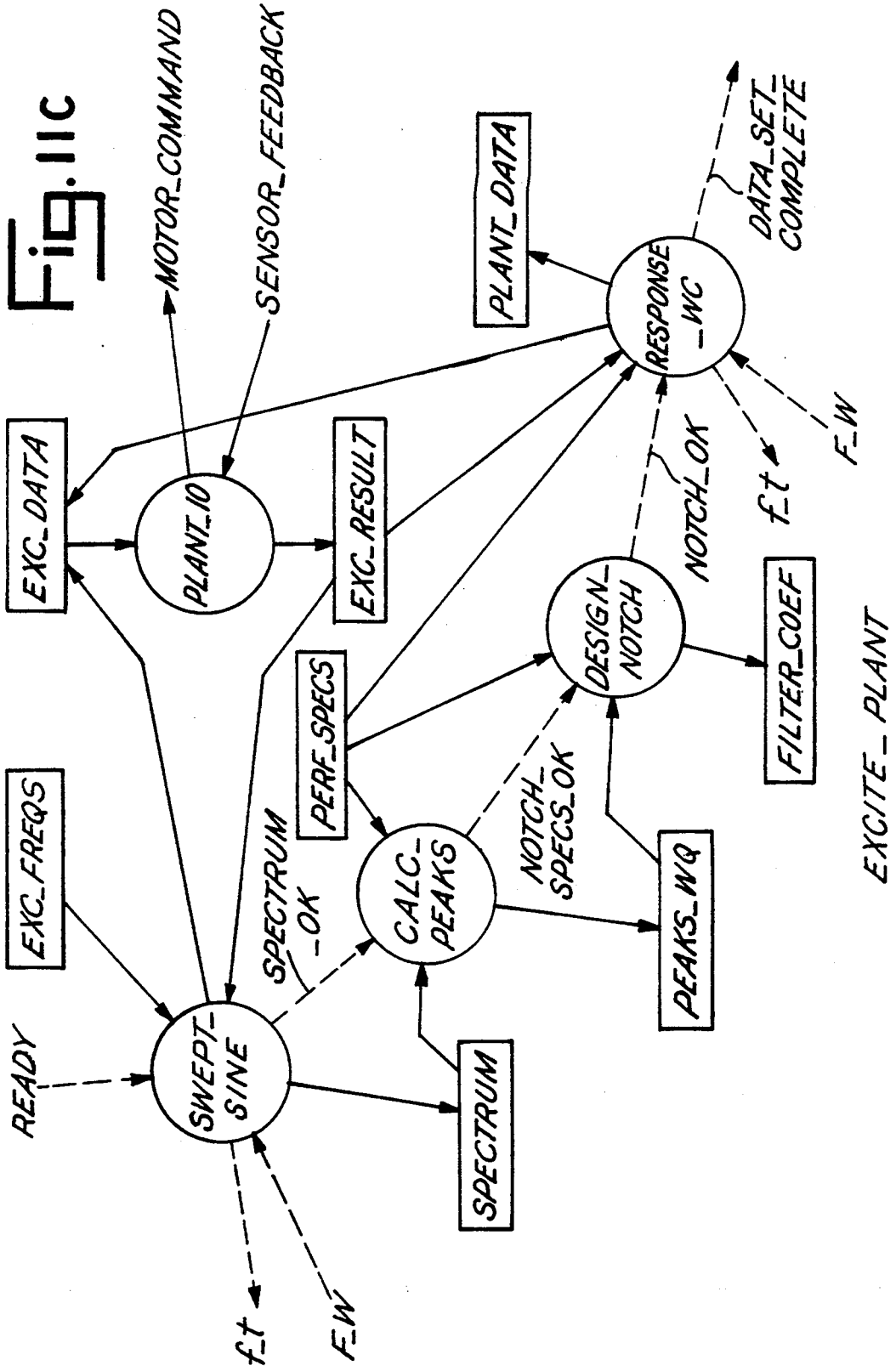

The modules appearing in FIGS. 11B and 11C, are entitled: (1) determine_freq; (2) FFT_init; (3) FFT; (4) excite_plant; (5) con_tuner; (6) swept_sine; (7) calc_peaks; (8) design_notch; (9) response_wc; and (10) plant_io. Comments are interspersed within each module and are denoted by "/*". Multiplication is indicated by an "*". The data and command signal names appearing in FIGS. 11B and 11C, are entitled: (1) complete (control flow)=; (2) data_set_complete (control flow)=; (3) exc_data (store)=; (4) exc_freqs (store)=; (5) exc_result (store)=; (6) f_t (control flow)=; (7) F_w (control flow)=; (8) filter_coef (store)=; (9) motor_command (data flow)=; (10) notch_ok (control flow)=; (11) notch_specs_ok (control flow)=; (12) peaks_wq (store)=; (13) perf_specs (store)=; (14) plant_data (store)=; (15) ready (control flow)=; (16) sensor_feedback (data flow)=; (17) setup (control flow)=; (18) spectrum (store)=; (19) spectrum_ok (control flow)=; (20) start (control flow)=; (21) twiddle_factors (store)=. The modules are briefly described immediately below. A brief description of the data and command signals follows the brief description of the modules.

Modules:

TITLE:
determine_freq

INPUT/OUTPUT:
start: control_in
perf_specs: data_in
exc_freqs: data_out
setup: control_out

BODY:

/* This process determines the excitation frequencies for the plant in order to obtain its spectrum. Resonant frequencies are passed in the perf_specs data structure. These resonant frequencies are determined by the axis control software by performing an FFT calculation of its own output. "wc" is the desired crossover frequency and is passed in the perf_specs data structure.
*/

32 exc_freqs ranging from $\omega_c/2$ to $16\omega_c$ fs = sampling frequency tr = time record length for n = 0 to 31

$$exc\_freqs[n] = (\frac{n+1}{tr}) = \frac{(n+1)fs}{64} = \frac{(n+1)\omega_c}{2}$$

$$where \quad \frac{fs}{64} = \frac{1}{tr} = \frac{\omega_c}{2}$$

TITLE: FFT_init

INPUT/OUTPUT:
setup: control_in
twiddle_factors: data_out
ready: control_out

BODY:

/* This process performs initialization the FFT module.
*/

Initialize nfp            /* number of freq points */
           nstage         /* number of stages in FFT */

Calculate twid[nfp]       /* twiddle factors used in FFT */

TITLE: FFT

INPUT/OUTPUT:
f_t: control_in
twiddle_factors: data_in
F_w: control_out

BODY:

/* This process performs the FFT and the Inverse FFT calculations for a power of 2 number of points. The data is bit reversed on the way in and the calculation is run in place. No windowing of the data is necessary since the data acquisition sample rate is optimized to obtain an integer number of periods of the frequency of interest.
*/

TITLE: swept_sine

INPUT/OUTPUT:
exc_freqs: data_in exc_result: data_in
F_w: control_in
ready: control_in
spectrum: data_out
f_t: control_out exc_data: data_out

BODY:

/* This process generates the excitation frequencies for the plant in order to obtain its spectrum.
*/

Set data acquisition sample time to optimize FFT.

For n = 0 — 31
  Use exc_freqs[] array and put data into exc_data structure for plant_io to use.
  Call FFT with
              plant_input
              plant_output
  as returned by plant_io in the structure exc_result. Calculate magnitude & phase of frequency of interest and put into spectrum data structure.

TITLE: calc_peaks

INPUT/OUTPUT:
perf_specs: data_in
spectrum: data_in
spectrum_ok: control_in
notch_specs_ok: control_out
peaks_wq: data_out

BODY:

/* This process calculates the resonant frequencies from the plant's spectrum.
*/

Calculate ideal response.
    0 db per decade - acceleration system
    20 db per decade - velocity system
    40 db per decade - position system Compare spectrum with estimate of ideal response. Based on deviations between the ideal and actual data estimate the number of resonant peaks, the frequencies, the q factor.

/* Since the resonances will not lie on the exc_freqs[] interpolate adjacent relative deviations to calculate the center frequency and q factor.
*/

TITLE: design_notch

INPUT/OUTPUT:
perf_specs: data_in
peaks_wq: data_in
notch_specs_ok: control_in
notch_ok: control_out
filter_coef: data_out

BODY:

/* This process designs the filters necessary to suppress unwanted resonant frequencies in the system bandwidth.
*/

For n = # of resonances found
    Use
        system_sample_time from perf_specs data structure.
        frequency and q factor data from peaks_wq data structure.

Prewarp the notch center frequency.
    Calculate filter_coef using the Tustin transformation.

TITLE: response_wc

INPUT/OUTPUT:
perf_specs: data_in
exc_result: data_in
F_w: control_in
notch_ok: control_in
plant_data: data_out
f_t: control_out
exc_data: data_out
data_set_complete: control_out

BODY:

/* This process performs a similar function to the swept_sine process. It only uses 1 frequency, the crossover frequency, and excites the notch filters and the plant together.
*/

Set data acquisition sample time to optimize FFT.

Use perf_specs and put data into exc_data structure for plant_io to use.

Call FFT with
    plant_input
    plant_output
    as returned by plant_io in the structure exc_result.

Calculate magnitude & phase of frequency of interest and put into plant_data structure.

TITLE: plant_io

INPUT/OUTPUT:
sensor_feedback: data_in
exc_data: data_in
exc_result: data_out
motor_command: data_out

BODY:

/* This process runs off the system_sample_time interrupt. It is a foreground task (servo mode). It should be noted that the main autotune process is a background task.
*/

Setup
    sine_frequency.
    sine_amplitude.

If (new_frequency or new_amplitude) and (zero_crossing)
    Calculate motor_command using new_frequency and new_amplitude.

Else
    Calculate motor_command using old_frequency and old_amplitude.

Output motor_command value to plant.

If (transient is over) and (dataset is incomplete)
    and (dataset_range is too small)
    and (sine_amplitude is less than upper limit)
        double sine_amplitude Else return plant_input and plant_output in exc_result data structure.

TITLE: con_tuner

INPUT/OUTPUT:
perf_specs: data_in
data_set_complete: control_in
plant_data: data_in
filter_coef: data_out
complete: control_out

BODY:

/* This process determines the compensator necessary to obtain the desired characteristics within the system bandwidth as well as the desired disturbance rejection.
*/

Calculate theta, the necessary lead or lag to be supplied by the controller theta = desired_phase_margin - 180 - plant_phase_wc if theta > 0
       lead controller, PID   (proportional-integral-derivative)
else
       lag controller, PI    (proportional-integral)

Derive controller gains ($k_p$, $k_i$, $k_d$)

Using First Backward Difference transformation, translate the gain to the z domain and write the result to filter_coef.

Data and Command Signals:

complete (control flow)=
    \* The autotune process has completed. \* data_set_complete (control flow)=
    \* The excite_plant process has completed and notch filters are designed and plant_data is ready for use by con_tuner.\* exc_data (store)=
    \* Data structure which allows the process swept_sine and response_wc to communicate frequency, amplitude and status information to the plant_io process. \* exc_freqs (store)=
    \* The set of excitation frequencies determined by the process determine_freq and used by excite_plant and swept_sine. \* exc_result (store)=
    \* Data structure which allows the process plant_io to communicate plant_input, plant_output and status information to swept_sine or response_wc. \* f_t (control flow)=
    \* Dataset of time data input to or output from the plant. \*

F_w (control flow)=
    \* Frequency domain representation of data input as f_t to the FFT process. \* filter_coef (store)=
    \* Per axis data structure containing all the digital filter coefficients used in the control algorithm. \* motor_command (data flow)=
    \* The value written to the digital to analog converter (DAC) on each axis and is used as the desired motor current.\* notch_ok (control flow)=
    \* Notch filter design process has completed. \* notch_specs_ok (control flow) =
* The resonant peaks have been derived and the design_notch process can now be run. * peaks_wq (store)=
* Data structure containing frequency and damping (q factor) information on the resonances found by the process calc_peaks. This information is used by design_notch to design filters. * perf_specs (store)=
* Data structure containing desired performance specifications from the main axis control software. It contains crossover frequency, phase margin and any known resonance data. * plant_data (store)=
* Data structure containing plant magnitude and phase information for use by con_tuner in designing either a PID or a PI controller. The frequency of interest is the crossover frequency. * ready (control flow)= -
* The FFT_init process has completed and control is passed to excite_plant. * sensor_feedback (data flow)=
* This value is the input from the plant feedback sensor used for control. * setup (control flow)=
* Input to transfer control to FFT_init. * spectrum (store)=
* Data structure containing plant magnitude and phase information at exc_freqs[]. * spectrum_ok (control flow)=
* Input to calc_peaks indicating valid spectrum data exists and can be used to calculate resonances. * start (control flow)=
* Input to allow the autotune process to commence. * twiddle_factors (store)=
* Data structure containing FFT constants. *

Various preferred embodiments of the present invention have been described. It is understood, however, that changes and modifications can be made without departing from the true scope and spirit of the present invention as defined by the following claims, which are to be interpreted in view of the foregoing.

What is claimed is:

1. A method of automatically tuning a plant adapted to be controlled by one or more digital filters and a compensator, said plant within a system expected to operate according to a predetermined performance specification, said system having a crossover frequency, said method comprising, in combination, the steps of:
   applying a plurality of plant text test signals to said plant;
   measuring the frequency response of said plant to said plurality of plant test signals and detecting resonant frequencies of the plant;
   adjusting said one or more digital filters by calculating and implementing coefficients of said one or more digital filters such that when said one or more digital filters are combined with said plant, said one or more digital filters suppress the detected resonant frequencies;

applying a compensator test signal to said one or more digital filters and said plant wherein said compensator test signal has a frequency substantially equal to said crossover frequency;

measuring the magnitude and phase response of said one or more digital filters and said plant at said frequency substantially equal to the crossover frequency; and adjusting the phase and gain of said compensator in response to said measured magnitude and phase response of said one or more digital filters and said plant at said frequency substantially equal to said crossover frequency, said step of adjusting comprising the step of calculating and implementing coefficients of said compensator such that, when said compensator is combined with said one or more digital filters and said plant, the combination has a frequency response consistent with said predetermined performance specification.

2. The method of claim 1 wherein said one or more digital filters comprises one or more notch filters.

3. The method of claim 1 wherein said coefficients of said at least one or more digital notch filters are calculated using a Tustin transform with prewarp of said detected resonant frequency.

4. The method of claim 2 wherein said plurality of plant test signals comprise sinusoidal signals having discrete frequencies that are multiples of said crossover frequency.

5. The method of claim 2 further including the step of calculating the magnitude and phase response of said plant to said plurality of plant test signals.

6. The method of claim 5 wherein the step of adjustment of said one or more digital filters comprises performing a fast Fourier transform of the response of said plant to said plurality of plant test signals.

7. The method of claim 2 wherein the step of adjusting the gain and phase of said compensator comprises the step of performing a fast Fourier transform of the response of said plant and said one or more digital notch filters to said compensator test signal.

8. The method of claim 2 wherein said compensator is a type Proportional-Integral-Differential or a type Proportional-Integral.

9. The method of claim 1 wherein the step of calculating said coefficients of said compensator includes the step of calculating the phase necessary to provide a desired phase margin of the system and the gain necessary to provide a unity gain at the crossover frequency of the system, and responsively adjusting said compensator according to said calculated necessary gain and phase margin.

10. The method of any one of claims 1, 4, 5, 6 or 7 wherein said plant test signals are sinusoidal signals and wherein the compensator test signal is a sinusoidal signal.

11. A digital control system for automatically tuning a plant, said plant within a system expected to operate according to a predetermined performance specification, said digital control system comprising:

one or more digital filters;

a compensator;

plant identification means for characterizing the frequency response of said plant within a predetermined bandwidth, said plant identification means comprising, signal generation means for generating and applying a plurality of plant test signals to said plant, plant spectrum characterization means for determining the frequency response of said plant to said plurality of plant test signals, and resonance detection means for detecting resonances of said plant;

filter design means for determining and implementing coefficients of said one or more digital filters enabling suppression of the detected resonances; and compensator design means for calculating and implementing the coefficients of said compensator including, input signal generation means for generating and applying a compensator test signal to said one or more digital filters and said plant wherein said compensator test signal is characterized by having a frequency substantially equal to the crossover frequency of said system, response measuring means for measuring the frequency response of said one or more digital filters and said plant at said crossover frequency, and compensator calculating means for calculating and implementing coefficients of said compensator based on the frequency response of the response measuring means characterized in that when said compensator is combined with said one or more digital filters and said plant, the combination has said frequency response consistent with said predetermined performance specification.

12. The autotuning system of claim 11 wherein said plant spectrum characterization means calculates the magnitude and phase response of said plant by performing a fast Fourier transform of the response of said plant and said plurality of plant test signals.

13. The autotuning system of claim 11 wherein said one or more digital filters comprises one or more digital notch filters.

14. The autotuning system of claim 13 wherein said compensator calculating means calculates the magnitude and phase response of said plant and said one or more digital notch filters by performing a fast Fourier transform of the response of said plant and said one or more notch filters to said compensator signal.

15. The method of claim 13 wherein said compensator is a type Proportional-Integral-Differential or a Proportional-Integral.

16. The autotuning system of claim 13 wherein said plurality of plant test signals comprise sinusoidal signals having frequencies that are multiples of said crossover frequency.

17. The autotuning system of claim 16 wherein said calculation of the magnitude and phase response of said plant to said plurality of plant test signals includes performing a fast Fourier transform of the response of said plant to said plurality of plant test signals.

18. The autotuning system of any one of claims 11, 12, 14, 16 or 17 wherein said plant test signals are sinusoidal signals and wherein said compensator test signal is a sinusoidal signal.

19. The method of claim 1, wherein said system comprises an aerial reconnaissance camera system.

20. The method of claim 1, wherein said system comprises a stabilized platform for a sensor.

21. The method of claim 19 or claim 20, wherein said plant comprises an inertial rate sensor.

* * * * *